(12) United States Patent
Legay

(10) Patent No.: US 6,487,452 B2
(45) Date of Patent: Nov. 26, 2002

(54) CIRCUIT FOR DETECTION OF THE PRESENCE OF A PERMANENT MAGNET IN THE VICINITY OF AN ACTIVE MEDICAL DEVICE, IN PARTICULAR A PACEMAKER, DEFIBRILLATOR, CARDIOVERTOR AND/OR MULTISITE DEVICE

(75) Inventor: Thierry Legay, Fontenay-les-Bris (FR)

(73) Assignee: Ela Medical S.A., Montrouge (FR)

( * ) Notice: Subject to any disclaimer, the term of this patent is extended or adjusted under 35 U.S.C. 154(b) by 111 days.

(21) Appl. No.: 09/816,646

(22) Filed: Mar. 23, 2001

(65) Prior Publication Data

US 2001/0032650 A1 Oct. 25, 2001

(30) Foreign Application Priority Data

Mar. 24, 2000 (FR) .......................................... 00 03744

(51) Int. Cl.[7] ................................................. A61N 1/37
(52) U.S. Cl. ...................... 607/32; 607/60; 324/207.16; 604/891.1
(58) Field of Search .............................. 607/32, 60, 63, 607/27, 55, 57; 324/207.11, 207.15, 207.16; 604/891.1

(56) References Cited

U.S. PATENT DOCUMENTS

| 4,260,949 A | * | 4/1981 | Dalton, Jr. | |
| 4,541,431 A | * | 9/1985 | Ibrahim et al. | |
| 4,611,127 A | | 9/1986 | Ibrahim et al. | 307/116 |
| 4,821,023 A | | 4/1989 | Parks | 340/551 |
| 5,541,507 A | * | 7/1996 | Ekwall | |
| 5,545,187 A | * | 8/1996 | Bergstrom et al. | |
| 5,662,694 A | * | 9/1997 | Lidman et al. | |
| 5,694,952 A | * | 12/1997 | Lidman et al. | |
| 5,709,225 A | * | 1/1998 | Budgifuars et al. | |
| 6,018,296 A | | 1/2000 | Herzer | 340/572 |
| 6,247,474 B1 | * | 6/2001 | Greeninger et al. | |

* cited by examiner

Primary Examiner—Mark Bockelman
(74) Attorney, Agent, or Firm—Orrick, Herrington & Sutcliffe LLP

(57) ABSTRACT

A circuit for detection of the presence of a permanent magnet in the vicinity of an active implantable medical device, in particular a pacemaker, a defibrillator, a cardioverter and/or a multisite device. This circuit includes a coil (12), able to respond to the presence of the magnet (16) so as to present a decreased value of its inductance, a resonant LC circuit (10) including the aforementioned coil, a generator (18) for pulse excitation of the resonant circuit; a circuit to analyze the pulse response of the resonant circuit, and a discriminating circuit, able to evaluate the value of the coil inductance from the analyzed pulse response and, correlatively, to determine therefrom the presence or the absence of the magnet. The excitation generator is able to deliver to the resonant circuit a burst of N successive pulses, and the analyzing circuit determines N corresponding pulse responses, and the discriminating circuit determines the presence of the magnet if, among N analyzed pulse responses, a number M ($M \leq N$) of them correspond to a decreased value of the inductance of the coil.

6 Claims, 1 Drawing Sheet

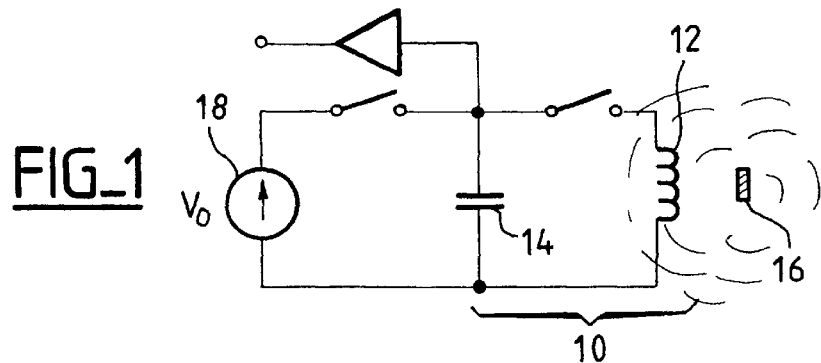
FIG_1
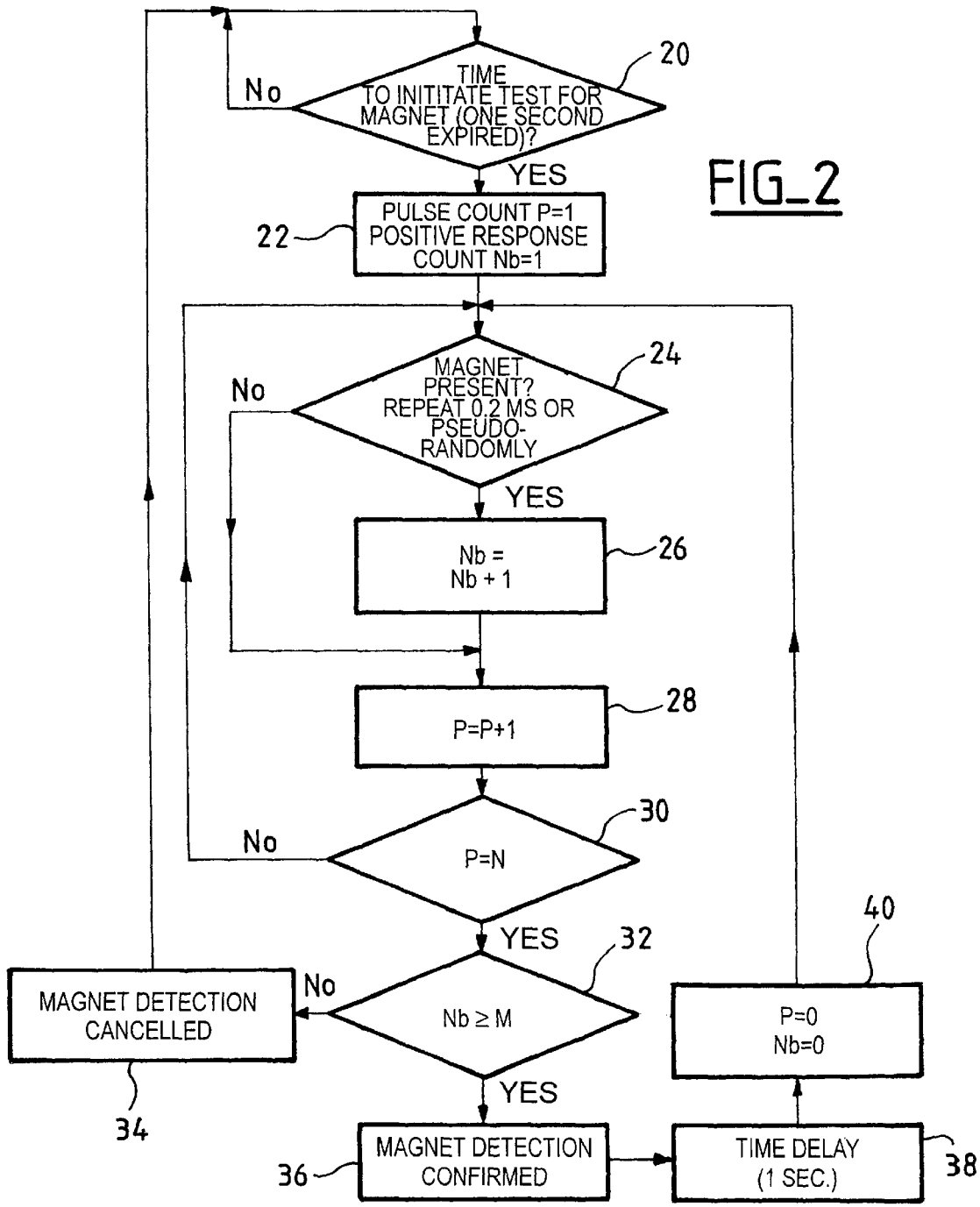
FIG_2

CIRCUIT FOR DETECTION OF THE PRESENCE OF A PERMANENT MAGNET IN THE VICINITY OF AN ACTIVE MEDICAL DEVICE, IN PARTICULAR A PACEMAKER, DEFIBRILLATOR, CARDIOVERTOR AND/OR MULTISITE DEVICE

FIELD OF THE INVENTION

The present invention relates to "active medical devices," and in particular to "active implantable medical devices," as such devices are defined by the Jun. 20, 1990 Directive 90/385/CE of the Council of the European Communities. This definition includes cardiac pacemakers, defibrillators, cardiovertors and/or multisite devices, and neurological apparatus, diffusion pumps for delivering medical substances, cochlear implants, implanted biological sensors, etc., as well as devices for measurement of pH or intracorporeal impedance (such as transpulmonary or intracardiac impedance measurements). The invention also can apply in an advantageous manner to non-implanted active medical devices such as Holter recorders, which are portable recorders that are carried by the patient for a long period of time to allow the uninterrupted recording of electrocardiographic signals.

BACKGROUND OF THE INVENTION

Many active medical devices are designed to be sensitive to the placement of a permanent magnet in proximity to the device, which action causes the device to be placed in a predetermined operating mode or configuration. This may be done in order to test the device (or the patient) or to allow programming of the device (for example, by telemetry in the case of an implant).

This particular mode, often called a "magnet mode", is a temporary operating mode, because many or at least certain of the otherwise established operating functions of the device are inhibited during the magnet mode. Typically also, the device does not present an optimum operation during the magnet mode phase.

It is essential for these active devices to detect the presence of the magnet in a reliable manner (i.e., with the best possible rejection of any disturbing phenomena), while minimizing the power consumption, which is an essential factor for autonomous (portable) medical implants that need to have the longest possible lifespan.

A first known technique for the detection of the presence of the permanent magnet uses a switch with a flexible shaft (known as a "reed switch"). The shaft moves in response to a magnet in proximity to switch a circuit within the device.

Another technique, to which the present invention refers, is taught by the U.S. Pat. No. 4,611,127, which uses an inductor-capacitor ("LC") oscillating circuit in which the value of the inductance of the inductor coil decreases in the presence of a magnetic field. This resonant circuit is excited by a signal pulse and a circuit measures the oscillation frequency resulting from the LC circuit. In the presence of a magnet, the value of the inductance is reduced and as a result the oscillation frequency increases. Consequently, by monitoring the zero-crossing characteristic of the current in the resonant circuit within a defined sensing window, or by measuring, for example, the time it takes a voltage stored on the capacitor to pass to zero for the first cycle or half cycle of the pulse response, one can deduce a diminution in the value of the inductance, and, consequently, the presence of a magnet proximate to the inductor (also referred to herein as a coil).

The disadvantage of this known technique is its sensitivity to magnetic or electric interference. Indeed, strong intensity fields, such as those which are produced, for example, by anti-theft protection devices or microwave ovens, are able to produce a large magnetic field component that can be detected by the detecting circuit. This is because the magnetic interference component generated by these devices typically has the same effect on the coil and its associated circuit as the quasi-continuous field produced by a magnet.

The problem is made worse by use of the principle of measurement by sampling, which is adopted for reasons of saving energy, specific to active implants. Thus, in the case of an apparatus such as pacemaker, the determination of the presence of a magnet is carried out once each cardiac cycle. However, there is a risk that the implant, deluded by an alternate magnetic interference field of sufficient strength to modify the value of inductance, changes to operate in the magnet mode in a manner that is inappropriate, and perhaps harmful for health of the patient bearing the apparatus.

A strong intensity electric field also can induce interferences that are superimposed on the pulse response of the oscillating circuit, and in the same way, delude the circuit that measures the period of the cycle or half cycles, and affect its response.

OBJECTS AND SUMMARY OF THE INVENTION

It is, therefore, an object of the present invention to propose a circuit for detecting the presence of a magnet which eliminates, or at least substantially reduces the above-mentioned disadvantages.

The circuit of the present invention is of a known general type according to U.S. Pat. No. 4,611,127 mentioned above, i.e., including: a coil, able to cooperate with the aforementioned magnet so as to present a decreased value of its inductance in the presence of the magnet; a resonant LC circuit including the aforementioned coil; means for pulse excitation of the resonant circuit; means for analzing the pulse response of the resonant circuit; and discriminating means able to evaluate the inductance value of the coil from the analyzed pulse response and, correlatively, to determine the presence or the absence of the magnet. Suitable circuits for the foregoing are all described in the U.S. Pat. No. 4,611,127.

According to the invention, the pulse excitation means includes circuit means able to deliver to the resonant circuit a burst of N successive pulses, and the analyzing means includes circuit means able to determine the N corresponding pulse responses, and the discriminating means includes means able to determine the presence of the magnet if, among N analyzed pulse responses, a number M of them correspond to a decreased value of inductance of the coil. Preferably, $M \leq N$, and more preferably $M \geq N/2$.

More advantageously, the excitation means is operated in a manner whereby after having delivered a first pulse, it will continue thereafter to deliver the N−1 following pulses of the burst only if in response to the first pulse the analysis means has detected a pulse response corresponding to a decreased inductance value.

The excitation means optionally can include means for varying the moment of the delivery of the first pulse of the burst, and/or the intervals between the moments of delivery of the successive pulses of the same burst. The variation is preferably a pseudo-random variation and aids in discriminating interference.

When the active medical device is an implantable pacemaker, defibrillator, cardiovertor and/or multisite device, the successive pulses of the burst are preferably delivered over a duration that is shorter than the duration of a detected or stimulated cardiac cycle, as determined by the implant device.

BRIEF DESCRIPTION OF THE DRAWINGS

Other features, characteristics, and advantages of the present invention will appear to a person of ordinary skill in the art in view of the following detailed description of preferred embodiments of the present invention, made with reference to the annexed drawings, in which:

FIG. 1 is a circuit schematic of a resonant circuit LC and its excitation means; and FIG. 2 is a flow chart indicating the various stages of a process for a preferred embodiment of the present invention, in the example of a cardiac pacemaker.

DETAILED DESCRIPTION OF THE INVENTION

FIG. 1 presents schematically a resonant LC circuit (10), including a coil 12 associated (in series (not shown) or parallel) with a capacitor 14.

The impedance of coil 12 will be modified, in the direction of a reduction of inductance, in the presence of a permanent magnet 16 proximate to the implant. This reduction in inductance, correlatively, will increase the resonance frequency of LC circuit (10). This change is detectable by an appropriate circuit, for example, by evaluating the response of the LC circuit to the resonance change based on the voltage discharge of the capacitor 14 of the LC circuit that was previously charged by a voltage generator 18 to a voltage $V_o$. For example, the circuit can evaluate the time it takes for the capacitor voltage to pass to zero for the first half cycle or the first full cycle, as taught by the above-mentioned U.S. Pat. No. 4,611,127, to which one can refer for more details on this technique for the detection of the presence of a magnet proximate to an implant and for circuits which may be used to implement the excitations, detection and analysis.

Until now, the determination of the presence of a magnet has been usually carried out by sampling, once per cardiac cycle (in the example of the implant being a device such as a pacemaker, a defibrillator, a cardiovertor or a multisite device).

The present invention proposes to replace this sampling measurement by a burst of measurements during the same cardiac cycle. One thus operates a series of N measurements (typically N=64) at intervals of 200 μs. For each one of these measurements one applies the known process of determination of the presence or the absence of the magnet, or more precisely of the presence or the absence of a magnetic field of sufficient strength to modify in a substantial and detectable way the value of the inductance of coil 12.

Once these measurements are taken, the magnet is declared present if, among N samples, M measurements reveal the presence of an intense (i.e., noticeably detectable) magnetic field.

The choice of M compared to N is a compromise made between specificity and sensitivity of the detection of the magnet. One chooses a value for M such that preferably $M \geq N/2$.

It will be noted that if the value of M is high, close to N, the detection will be more specific, but less sensitive. For example, in the presence at the same time of an electric lancet or scapel and a magnet, if M is too high, the low magnetic component of the magnet is likely not to be detected, the interference being sufficient to give a negative result. However, it is often desirable to have the implant functioning in its magnet mode in the event of use of an electric lancet.

In a preferred embodiment, the full burst is triggered only if the first pulse response measurement is positive. This allows, most of the time, to minimize the energy consumption of the system. In other words, the burst is actually used as a burst for confirmation, with the most frequent mode of operation being a mode of examination of an isolated pulse response measurement, made once per cardiac cycle. If the first pulse response measurement indicates the presence of a magnetic field of sufficient strength, then the burst will be emitted to determine the effective presence, or not, of a magnet according to the technique described above.

Preferably, if the burst confirms the effective presence of a magnet, then one will systematically emit a complete burst for all following cardiac cycles until the next time the test fails. In this case, the device will return to the mode of examination based on an isolated pulse measurement, to be followed, when positive, by a burst for possible confirmation. In other words, as long as the magnet is detected as present, a complete burst will be systematically sent, independently of the result of the first measurement of the burst, and the device will return to examination of an isolated response only after withdrawal of the magnet.

For protection from interference which could be in synchronization or a repetitive beat with the frequency of the measures in the burst, one can advantageously produce varied bursts in which the interval between two pulses of the same burst and/or the period of recurrence of the first measurement of successive bursts are varied, more preferably varied in a pseudo-random manner.

FIG. 2 advantageously illustrates a detailed sequence of operations performed, in wired digital logic, by means of a microcontrollor. In the alternative, this technique can be realized by a software implementation, but to the detriment of the power consumption of the implant and thus of the lifespan of the device.

At stage 20, the process is initiated, at selected intervals, in this case of about one second, i.e., the duration of a cardiac cycle at rest. After stage 22, the counters for the number of delivered pulses P and for the number of positive pulse responses Nb are initialized. The burst is then emitted and with each pulse of the burst, at stage 24, the test is made for presence of the magnet, i.e., more precisely, the determination of a field of sufficient strength to reduce in a measurable amount the inductance of the coil. In the affirmative, at stage 26 the counter Nb of the number of positive measurements is incremented. In all cases, at stage 28, counter P of the burst is incremented. If the number of pulses counted P is not yet equal to the number of pulses N in the burst (stage 30), then stages 24 to 28 are repeated as previously described. At the end of the burst, one determines (stage 32) whether the number of positive measurements Nb reaches (or not) a predetermined threshold M.

In the negative case (stage 34) the detection of the magnet is cancelled and the process is put on standby until the moment of release of the next burst (stage 20). In the affirmative case, the detection of the magnet is confirmed (stage 36) and, after a delay of about one second (stage 38), the counters are reset to zero (stage 40) and the process repeats the test for the presence of the magnet (stages 24 and following). The device then remains by default in the mode of examination of an isolation pulse response followed by a confirmation burst.

One skilled in the art will appreciate that the present invention can be practiced by other than the described embodiments, which are presented for purposes of illustration and not of limitation.

I claim:

1. A circuit for detecting the presence of a permanent magnet in the vicinity of an active medical device comprising:

a coil having a first inductance in the absence of a proximate permanent magnet and a reduced inductance in the presence of a permanent magnet proximate to the coil;

a resonant LC circuit including said coil;

a pulse generator for pulse excitation of said resonant circuit;

means for analyzing a pulse response of the resonant circuit to said pulse excitation, and discriminating means, able to evaluate the value of the coil inductance resulting from the analyzed pulse response and, correlatively, to determine a presence and an absence of the proximate permanent magnet, characterized in that:

the pulse generator comprises means able to deliver a burst of N successive pulses, and the analyzing means comprises means able to determine N corresponding pulse responses, and the discriminating means comprises means able to determine the presence of the permanent magnet if, among N determined analyzed pulse responses, a number M of said determined analyzed pulse responses correspond to said reduced value of inductance, wherein M is less than N.

2. The circuit of claim 1, wherein $M \geq N/2$.

3. The circuit of claim 1, wherein the excitation means comprises first means for delivering a first pulse and second means for delivering N−1 pulses following said first pulse, wherein said second delivering means operates only in response to the analyzing means having determined, in response to said first pulse, a pulse response corresponding to a reduced value of inductance.

4. The circuit of claim 1, wherein the excitation means comprises means for varying in a pseudo-random manner an interval between delivery of the first pulse of each burst.

5. The circuit of claim 1, wherein the excitation means comprises means for varying in a pseudo-random manner an interval between delivery of each pulse of said burst.

6. The circuit of claim 1, wherein the active medical device is one of a pacemaker, a defibrillator, a cardiovertor and/or a multisite device comprising means for determining a duration of a stimulated or detected cardiac cycle, and wherein the pulse generator delivers the successive pulses of the burst over a duration that is less than the determined cardiac cycle duration.

* * * * *

UNITED STATES PATENT AND TRADEMARK OFFICE
CERTIFICATE OF CORRECTION

PATENT NO.    : 6,487,452 B2
DATED         : November 26, 2002
INVENTOR(S)   : Theirry Legay It is certified that error appears in the above-identified patent and that said Letters Patent is hereby corrected as shown below:

Column 1,
Line 35, after "called" delete "'magnet mode'", and insert -- "magnet mode," --

Column 2,
Line 13, after "such as" insert -- a --;

Column 4,
Line 33, after "successive burst" delete "are" and insert -- is --;

Drawings,
First caption, second line, before "test" delete "inititate" and insert -- initiate --;

Signed and Sealed this

Twenty-eighth Day of December, 2004

JON W. DUDAS
*Director of the United States Patent and Trademark Office*